United States Patent [19]
Graf

[11] Patent Number: 6,030,027
[45] Date of Patent: Feb. 29, 2000

[54] WIND PROTECTION ARRANGEMENT FOR AN OPEN MOTOR VEHICLE

[75] Inventor: Thomas Graf, Sindelfingen, Germany

[73] Assignee: Daimlerchrysler AG, Germany

[21] Appl. No.: 09/094,620

[22] Filed: Jun. 15, 1998

[30] Foreign Application Priority Data

Jun. 15, 1997 [DE] Germany ............................ 197 25 217

[51] Int. Cl.⁷ ................................................. B60J 7/22
[52] U.S. Cl. .......................................... 296/180.1; 296/85
[58] Field of Search ............................. 296/180.5, 180.1, 296/85

[56] References Cited

U.S. PATENT DOCUMENTS

| | | | |
|---|---|---|---|
| 5,195,799 | 3/1993 | Gotz et al. | 296/180.1 |
| 5,211,718 | 5/1993 | Gotz et al. | 296/180.1 |
| 5,318,337 | 6/1994 | Gotz et al. | 296/180.5 |
| 5,338,089 | 8/1994 | Gotz et al. | 296/180.5 |

FOREIGN PATENT DOCUMENTS

| | | | |
|---|---|---|---|
| 553572 | 8/1993 | European Pat. Off. | 296/180.1 |
| 8813139 | 1/1989 | Germany . | |
| 4037705C1 | 10/1991 | Germany . | |
| 9211431 | 11/1992 | Germany . | |
| 42 11 965 C1 | 4/1993 | Germany . | |
| 4315139 | 11/1993 | Germany | 296/180.1 |
| 197 14 938 A1 | 10/1998 | Germany . | |
| 56-29127 | 3/1981 | Japan . | |
| 4-274924 | 9/1992 | Japan . | |
| WO94/03342 | 2/1994 | WIPO . | |

*Primary Examiner*—D. Glenn Dayoan
*Assistant Examiner*—Chad D Wells
*Attorney, Agent, or Firm*—Evenson, McKeown, Edwards & Lenahan, P.L.L.C.

[57] ABSTRACT

A wind protection arrangement for an open passenger car is disclosed which has flexible flat type structure which is arranged so it can be rolled up and unrolled between an inoperative position and a protective position on a roll-up device. The roll-up device extends in a transverse direction of the vehicle and is fixed to the vehicle. A swivellable mounting frame which is fixed to the motor vehicle supports a forward edge of the flat shaped structure. This mounting frame can be swivelled between a folded-over basic position and an erected operative position about a swivel axis extending in parallel to a bearing axis of the roll-up device.

16 Claims, 2 Drawing Sheets

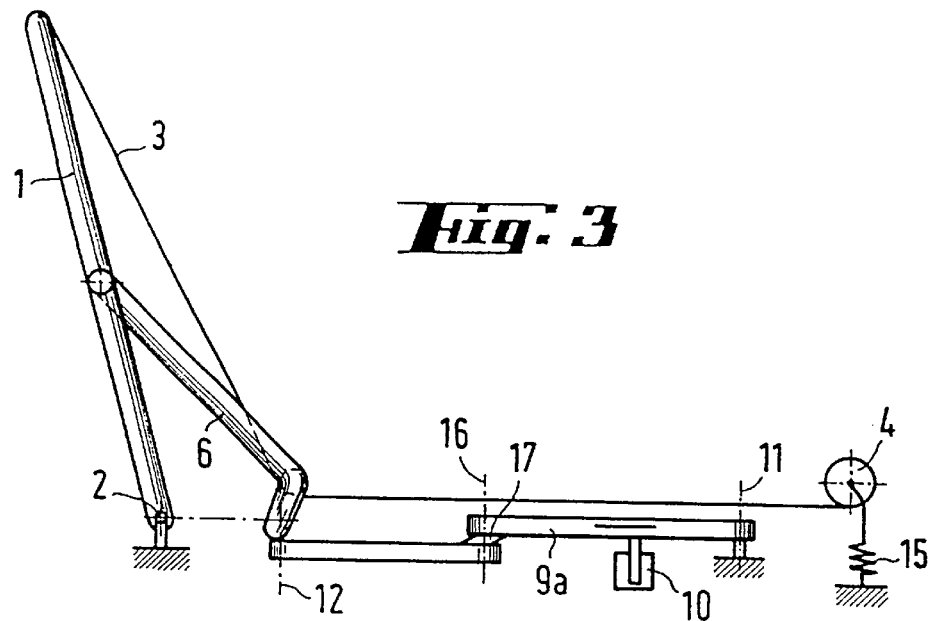
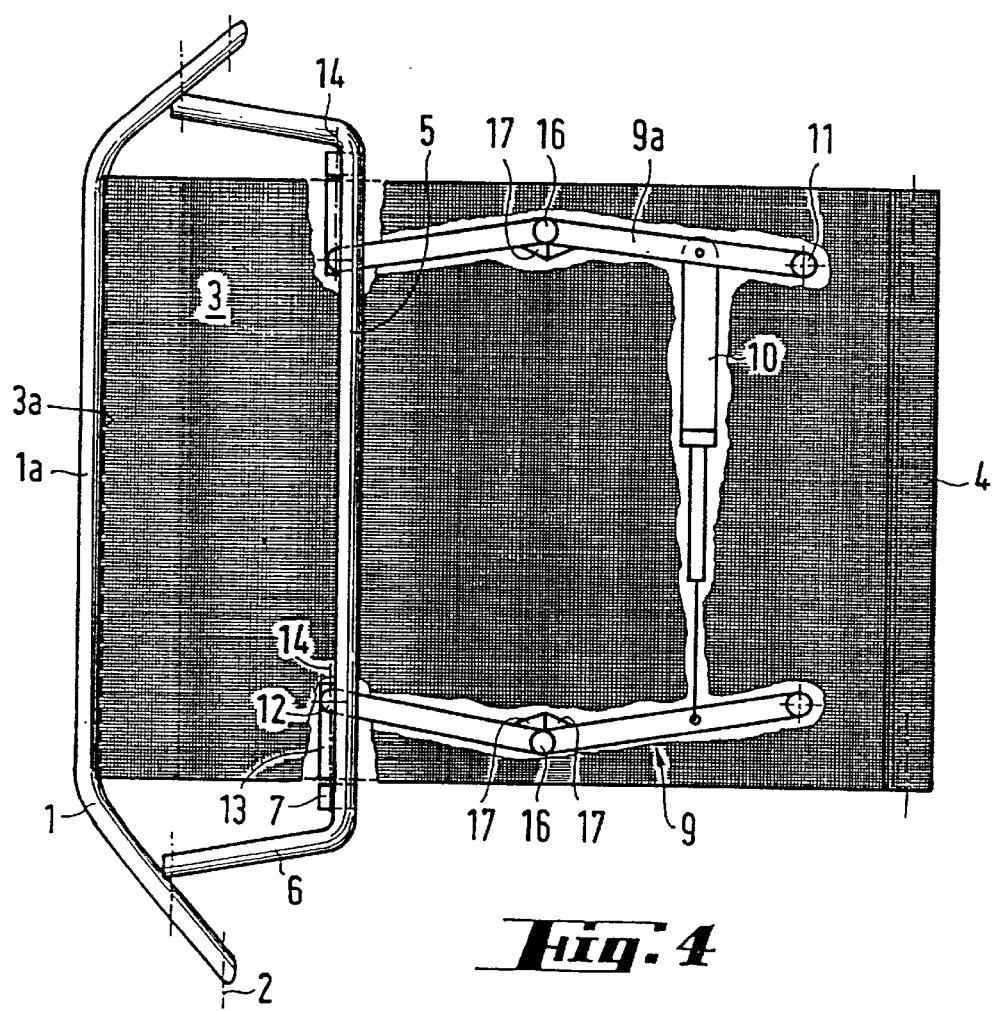

WIND PROTECTION ARRANGEMENT FOR AN OPEN MOTOR VEHICLE

BACKGROUND AND SUMMARY OF THE INVENTION

This application claims the priority of German application 197 25 217.6-21, filed in Germany on Jun. 15, 1997.

The invention relates to a wind protection arrangement for an open motor vehicle, having a flexible flat shaped structure which extends in the transverse direction of the vehicle and is fixed to the vehicle, and which is arranged so it can be rolled up and unrolled on a roll-up device, between a rolled-up inoperative position and a protective position pulled out upwards over a vehicle space boundary.

A wind protection device of this type is known from German Patent Document DE 40 37 705 C1. There, a rigid horizontally arranged covering is provided for the front area of a convertible, on which covering a wind-up roller is mounted adjacently at the level of the vehicle board edge directly behind the front seats, which wind-up roller contains a flexible wind partition which can be pulled out in the upward direction. The wind partition can be unrolled from a wound-up inoperative position into an operative position in which it is fastened to an upright rollover bar fixedly connected with the vehicle body and is mounted vertically behind the front seats.

In addition, from Patent Document WO 94/03342, a wind protection arrangement is known which consists of a flexible fabric-type foil with reinforcing devices extending in the transverse direction of the vehicle. The completely removable wind protection arrangement is stretched over the backrest of a rear seat bench from which it is first guided horizontally toward the front to an area below a rollover bar, in which case, particularly at this point, cross struts are provided within the wind protection arrangement. A fixing in this position takes place by way of tightening straps. In its further course, the fabric-type foil is guided diagonally upwards and is fastened and mounted on a rigid rollover bar behind the front seats.

It is an object of the invention to provide a wind protection arrangement of the initially mentioned type in the case of which the storage space for the wind protection arrangement in its inoperative position is arranged particularly advantageously in the vehicle and the pulling-out and mounting of the wind protection device can be carried out in a particularly simple manner.

According to the invention, this object is achieved by providing a wind protection arrangement for an open motor vehicle, having a flexible flat shaped structure which is arranged so it can be rolled up and unrolled on a roll-up device, which extends in the transverse direction of the vehicle and is fixed to the vehicle, between a rolled-up inoperative position and a protective position pulled out upwards over a vehicle board, wherein the front edge of the flat shaped structure, which is forward in a pull-out direction, is fixed on a mounting frame which can be swivelled between a folded-over basic position and an erected operative position about a swivel axis extending in parallel to a bearing axis of the roll-up device.

By means of the solution according to the invention, a durable linking of the flexible flat shaped structure forming the wind partition to the mounting frame as well as to the roll-up device can be achieved. As a result, a reliable and secure bearing of the flexible flat shaped structure which is easy to handle is obtained in the rolled-up inoperative position as well as in the pulled out protective position.

Since, at any point in time of the pull-out operation, the flexible flat shaped structure is fixed between the mounting frame and the roll-up device, a direct manual handling of the flat shaped structure itself is not necessary which, on the one hand, increases its service life and, on the other hand, permits an automation of the erecting operation. In addition, the solution according to the invention does not require—as is the case in the state of the art—a vehicle-body-fixed rigid rollover bar on which the flat shaped structure is fixed. On the contrary, the solution according to the invention is suitable particularly for completely open convertibles without rollover bars, in that it offers a good wind protection effect also for these vehicles.

By means of an advantageous further development of preferred embodiments of the invention, a favorable arrangement of the flat shaped structure in its protective position is achieved by providing an arrangement wherein the roll-up device is arranged relative to the normal driving direction of the vehicle on a back side with respect to a rear area of a vehicle interior, and wherein at least in the protective position of the flat shaped structure directly behind a front seat area of the vehicle interior, a deflection support is provided which extends in the transverse direction of the vehicle and about which the pulled-out flat shaped structure is deflected such that it is divided into a covering section spanning the rear area and into a protective section extending upwards.

In particular, the flat shaped structure simultaneously permits wind protection of the front seat area as well as a covering of the rear area. In addition, it can be positioned, including its mounting frame, in a particularly advantageous manner in its rolled-up inoperative position on the rear side of the rear area in the vehicle so that the seats in the rear area are also freely available.

By means of an arrangement wherein the deflection support is disposed in a linearly displaceable manner between a rearward end position adjacent to the roll-up device and a forward end position arranged directly behind the front seat area, a reliable positioning of the flexible flat shaped structure in its protective position is permitted which can be implemented at low expenditures.

By means of an advantageous further development of the invention wherein the deflection support is forcedly coupled by means of a transmission linkage such with the mounting frame that, in the event of a linear displacement of the deflection support, the mounting frame is swivelled into its operative position or its basic position, the movements of the mounting frame and of the deflection support are coupled so that the thus created guiding mechanism, together with the flat shaped structure, can be swivelled by means of a single force to be introduced from its basic position into an operating position.

According to another advantageous feature of preferred embodiments of the present invention, a driving mechanism is provided for the linear displacement of the deflection support which permits the introduction of a precisely definable force to the guiding linkage.

By means of an arrangement according to certain preferred embodiments wherein the driving mechanism has a scissors-type linkage which is fixedly disposed on the vehicle and is linked to the deflection support and which can be operated by means of an adjusting element, an automatic triggering of the wind protection arrangement is permitted which can be implemented by simple devices.

By means of an arrangement according to certain preferred embodiments wherein the scissors-type linkage has double-sided linkage sections which can be operated jointly and synchronously by the adjusting element, a driving mechanism is provided which can be handled in a particularly simple and reliable manner.

By means of an arrangement according to certain preferred embodiments wherein the linkage sections are provided with stops in their stretched over-dead-center positions, the stretched over-dead-center positions corresponding to the operative position of the deflection support, a locking of the wind protection arrangement in its operative position is achieved in a particularly simple manner. In this case, the restoring force of the roll-up device is utilized for fixing the scissors-type linkage in its over-dead-center position so that a locking effect is obtained and a separating locking device is not necessary.

By means of an arrangement according to certain preferred embodiments of the present invention wherein a pneumatic or hydraulic lifting cylinder is provided as the adjusting element and extends transversely between the two linkage sections, on the one hand, an adjusting element is provided which is particularly easy to handle and, on the other hand, a favorable introduction of force into the scissors-type linkage is provided. Furthermore, a space-saving and reliably operating drive for the wind protection device is obtained.

Other objects, advantages and novel features of the present invention will become apparent from the following detailed description of the invention when considered in conjunction with the accompanying drawings.

BRIEF DESCRIPTION OF THE DRAWINGS

FIG. 3 is a lateral view of the wind protection arrangement according to FIG. 1, in which case the wind protection arrangement is swivelled into its operative position;

FIG. 4 is a top view of the wind protection arrangement according to FIG. 3.

DETAILED DESCRIPTION OF THE DRAWINGS

Figure 1:
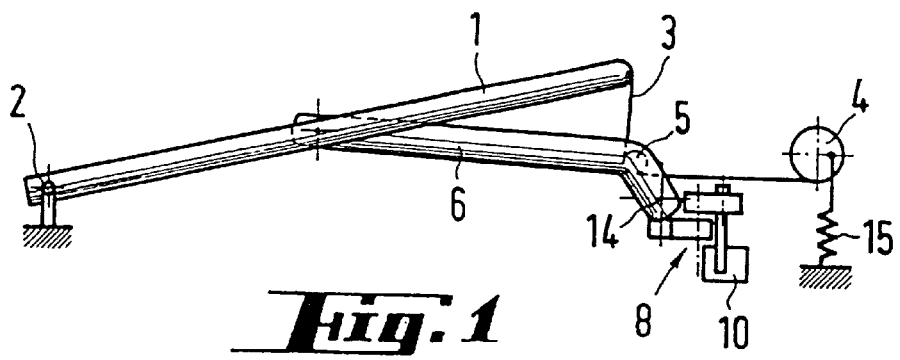
FIG. 1 is a schematic lateral view of a wind protection arrangement according to the invention for an open motor vehicle in its inoperative position.

The figures illustrate a wind protection arrangement according to the invention for an open motor vehicle, particularly a passenger car. It has a mounting frame 1 which, by way of swivel bearings with a common axis 2, in an area directly behind the front seats of the open motor vehicle which is not shown, is swivellably connected with it. In the top view, the mounting frame is constructed in a U-shaped manner such that, in its folded-over basic position illustrated in FIGS. 1 and 2, it reaches around a rear seat area in the open motor vehicle and thus permits its utilization. On a transverse strut 1a of the mounting frame, a forward face 3a of a net-type flat structure 3 used as the flexible flat shaped structure is fastened, in which case the net-type flat structures 3 are, in addition, fixed on the opposite front edge on a roll-up device 4. The net-type flat structure 3, which can also be constructed as a web of fabric, is guided by way of a deflection support 5 which, on the one side, by way of two legs 6 used as a transmission linkage, is swivellably fixed on the mounting frame 1 and, on the other side, by way of two deflection bows 7, is fixed to a driving mechanism 8.

Figure 2:
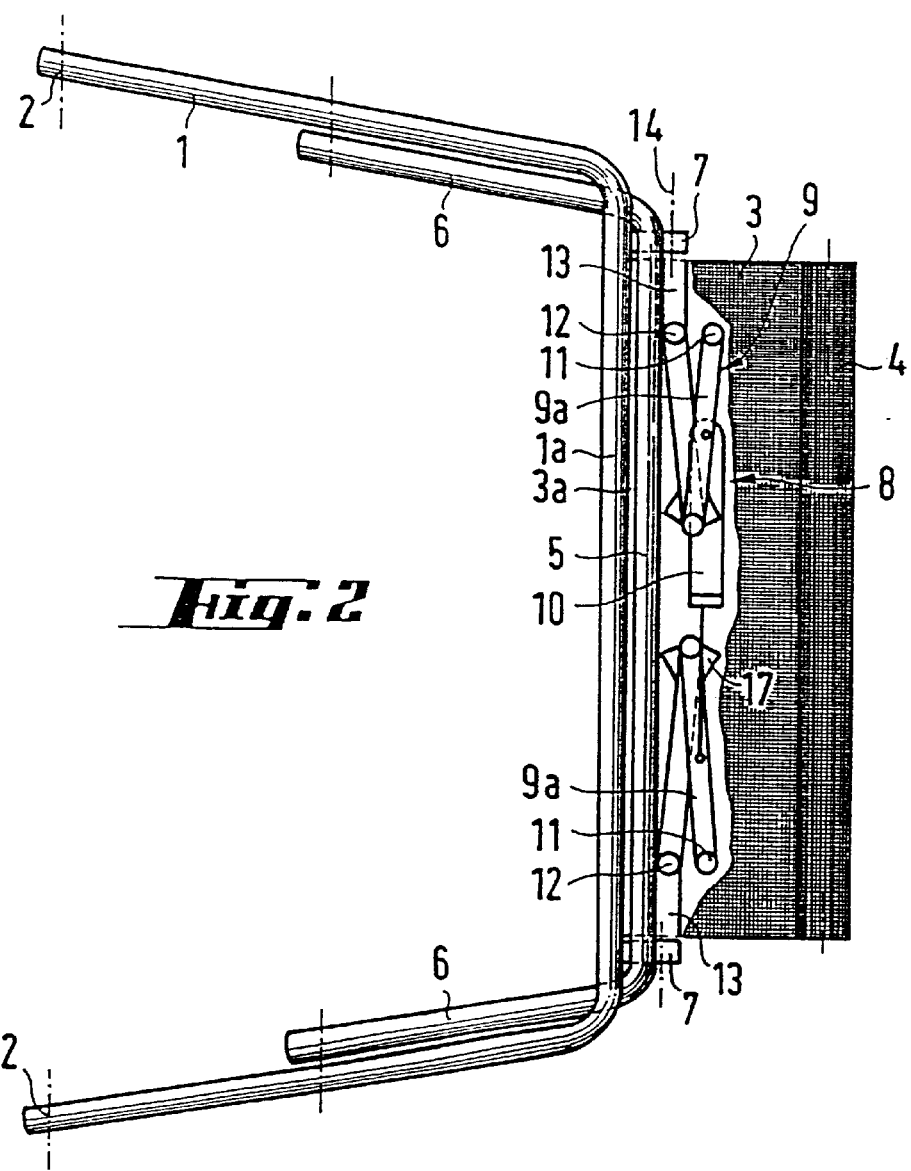
FIG. 2 is a top view of the wind protection arrangement according to FIG. 1.

In the basic position of the wind protection arrangement illustrated in FIGS. 1 and 2, the transverse connection 1a of the mounting frame, the deflection support 5, the driving mechanism 8 and the roll-up device 4 are housed in a space-saving manner in an installation space between the rear compartment and the trunk of the open motor vehicle.

The driving mechanism 8 is composed of a scissors-type linkage 9 and a hydraulic lifting cylinder 10 used as an adjusting element. With respect to the longitudinal axis of the vehicle, the scissors-type linkage 9 is symmetrically constructed of two linkage sections which, at their rearward bearing points 11, are disposed swivellably about axes oriented in parallel to the vertical direction of the vehicle and fixed to the vehicle. Each linkage section has two linkage arms which can be folded in a scissors-type manner, are connected with one another in a hinged fashion and whose end-side bearing points are in a reverse manner fixed to the vehicle and on the front side are arranged on the deflection carrier. At their forward bearing points 12, the linkage sections are also swivellable about axes oriented in parallel to the vertical axis of the vehicle connected with holding devices 13 which, in turn, are swivellable about an axis aligned in parallel with the transverse axis of the vehicle connected with deflection bows 7. The lifting cylinder 10 is arranged such between the two rearward linkage sections 9a that an extending movement of the pertaining piston from the lifting cylinder 10 achieves a moving-out motion of the scissors-type linkage in the driving direction of the motor vehicle.

This effect occurs particularly in that the forward bearing points 12 of the scissors-type linkage, starting from the basic position illustrated in FIG. 2, can be linearly displaced by means of a forced guidance, which is achieved by means of the deflection bows 7 and the holding devices 13, exclusively in the direction of the longitudinal axis of the vehicle.

Starting from the position illustrated in FIGS. 1 and 2, the erection movement of the wind protection device takes place by an admission of pressure to the hydraulic lifting cylinder 10, whose piston is extended from an initial inoperative position into the transverse direction of the vehicle, whereupon the forward bearing points 12 of the scissors-type linkage 9 are displaced in the driving direction. In this case, the deflection bows 7, which are fixedly connected with the deflection support 5, rotate about the axes 14 relative to the holding devices (13), whereby, because of the rigid linking of the deflection bows 7, the deflection support 5 is also caused to carry out a swivel motion about the axes 14 on which, however, the linear movement of the whole arrangement is superimposed in the driving direction of the motor vehicle. Finally, by way of the two legs 6, the mounting frame 1 is swivelled upward about the axes of its bearing points 2 in the upward direction beyond the vehicle board edge.

The described swivel movement takes place until the scissors-type linkage has exceeded its dead center position and the mounting frame 1 is swivelled into its erected operative position. This operative position of the wind protection device is illustrated in FIGS. 3 and 4. In this case, the net-type flat structure 3 is now pulled out into its protective position, in which case a covering section of the net-type flat structure is first stretched approximately horizontally over the rear compartment of the motor vehicle to the deflection carrier 5, and a protective section is guided upwards beyond the height of the vehicle occupants' heads, the forward front edge 3a of the net-type flat structure 3 still being fixedly connected with the transverse strut 1a of the mounting frame.

By means of the unwinding of the net-type flat structure 3 from the roll-up device 4, its restoring spring 15, which always acts against the pull-out direction, is tensioned such that it exercises a restoring effect on the wind protection arrangement. Since, however, the scissors-type linkage 9 has exceeded its dead center, a restoring force introduced into the mounting frame causes a movement of the center joints 16 of the scissors-type linkage toward the outside which is blocked in the position illustrated in FIG. 4 by stops 17 mounted on the linkage sections. In this manner, a locking of the wind protection arrangement in its operative position is achieved which is easy to implement so that the lifting cylinder 10 can be relieved from pressure. It is understood that a locking of the wind protection arrangement in its operative position can also be achieved by any other locking or stop devices, in which case a positioning of the scissors-type linkage in an over-dead-center position by means of the restoring spring 15 makes a high-expenditure lock superfluous.

A restoring operation of the wind protection arrangement is triggered by a retracting of the piston into the lifting cylinder, in which case the scissors-type linkage leaves its over-dead-center position and subsequently is returned into its inoperative position by means of the forces which can be introduced by the restoring spring 15 and/or the lifting cylinder 10.

In this case, it was found to be particularly advantageous that only a single adjusting element is required for driving the wind protection arrangement, and the wind protection arrangement permits an optimal utilization of space within the motor vehicle, particularly in its inoperative position. In addition, good wind protection characteristics are achieved in the operative position of the wind protection arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Wind protection assembly for an open motor vehicle comprising:
   a roll-up device,
   a flexible flat structure having one end supported at the roll-up device, said flexible flat structure being movable between a rolled up inoperative position and an operative wind protection position, and
   a mounting frame connected to an end of the flexible flat structure remote from the roll-up device, said mounting frame being movable about a swivel axis, said swivel axis being parallel to a bearing axis of the roll-up device between a stowage position with said flexible flat structure in said inoperative position and an operative position supporting the flexible flat structure in said operative wind protection position.

2. Wind protection assembly according to claim 1, wherein said mounting frame includes a deflecting structure which supports the flexible flat structure over a first of the flexible flat structure adjacent the roll-up device and a second of the flexible flat structure extending from the first section in an upward direction, whereby, when in said operative wind protection position, said flexible flat structure extends substantially horizontally forward of the roll-up device in said first section and then substantially vertically upwardly in said second section.

3. Wind protection arrangement according to claim 2, wherein the deflection support structure is forcedly coupled by means of a transmission linkage with the mounting frame, such that, in the event of a linear displacement of the deflection support structure, the mounting frame is swivelled into its operative position or its stowage position.

4. Wind protection arrangement according to claim 3, wherein a driving mechanism is provided for linear displacement of the deflection support structure.

5. Wind protection arrangement according to claim 4, wherein the driving mechanism has a scissors-type assembly that can be disposed on the vehicle and is linked to the deflection support structure and can be operated by means of an lifting cylinder.

6. Wind protection arrangement according to claim 5, wherein the scissors-type assembly comprises two-scissors type linkages that can be operated jointly and synchronously by the lifting cylinder.

7. Wind protection arrangement according to claim 6, wherein the lifting cylinder is a hydraulic cylinder and extends transversely between the two scissors-type linkages.

8. Wind protection arrangement according to claim 2, wherein a driving mechanism is provided for linear displacement of the deflection support structure.

9. Wind protection arrangement according to claim 8, wherein the driving mechanism has a scissors-type assembly that can be disposed on the vehicle and is linked to the deflection support structure and can be operated by means of a lifting cylinder.

10. Wind protection arrangement according to claim 9, wherein the scissors-type assembly comprises two scissors-type linkages that can be operated jointly and synchronously by the lifting cylinder.

11. Wind protection arrangement according to claim 10, wherein stops are mounted on the two scissors-type linkages.

12. Wind protection arrangement according to claim 11, wherein the lifting cylinder is a hydraulic cylinder and extends transversely between the two scissors-type linkages.

13. Wind protection arrangement according to claim 10, wherein the lifting cylinder is a hydraulic cylinder and extends transversely between the two scissors-type linkages.

14. Wind protection assembly according to claim 1, comprising a driving mechanism for forcibly moving the mounting frame between the stowage and operative positions.

15. Wind protection assembly according to claim 14, wherein said driving mechanism includes a scissors type assembly that can be disposed on the vehicle and can be operated by means of a lifting cylinder.

16. Wind protection assembly according to claim 15, wherein said assembly that can be includes a fluid operated piston-cylinder unit.

* * * * *